United States Patent

[11] 3,629,679

[72] Inventor Martin O. Halfhill
San Jose, Calif.

[21] Appl. No. 50,631
[22] Filed June 29, 1970
[45] Patented Dec. 21, 1971
[73] Assignee Information Storage Systems, Inc.
Cupertino, Calif.

[54] LINEAR MOTOR POWER FAILURE DETECTION CIRCUIT AND FAIL-SAFE CONTROL
7 Claims, 2 Drawing Figs.

[52] U.S. Cl. .................... 318/563, 318/687, 318/479, 317/13
[51] Int. Cl. .................... G05b 9/02
[50] Field of Search .................... 318/563, 687, 479; 317/13

[56] References Cited

UNITED STATES PATENTS 3,405,337 10/1968 Popik .................... 318/563
3,483,455 12/1969 Klysa, Jr. et al .................... 318/563

*Primary Examiner*—T. E. Lynch
*Attorneys*—Gerald L. Moore and Robert B. Crouch

ABSTRACT: A circuit for controlling an actuator including means for setting the actuator for movement to a rest position in response to an interruption in the electrical power supplied, with the actuator being energized after the power interruption by energy stored in the circuit normally used for regulating the circuit waveform.

INVENTOR.
MARTIN O. HALFHILL
BY Gerald L. Moore
ATTORNEY

LINEAR MOTOR POWER FAILURE DETECTION CIRCUIT AND FAIL-SAFE CONTROL

CROSS-REFERENCE TO RELATED APPLICATIONS

This circuit is adapted for use with such actuators as those described in U.S. application Ser. No. 792,343 entitled "Apparatus for Maintaining a Servo Controlled Member in a Selected Position" filed on Jan. 21, 1969, with the same assignee as the subject application.

BACKGROUND OF THE INVENTION

1. Field of the Invention

This invention relates in general to the control of actuators such as those used in disc drives to store information for use in computer systems.

2. Description of the Prior Art

In disc drives, as in many other similar types of apparatus, it is necessary to utilize an actuator for positioning a member, such as moving a recording head across a recording disc surface. The recording head is supported above the disc surface on a film of air to prevent contact therebetween which might otherwise damage one or both members. The film or air results from the rotation of the disc at very high speeds, thereby creating an air cushion on which the head rides. Naturally, it is imperative that the head be withdrawn from the vicinity of the disc if the disc rotating speed is reduced substantially because, without the air film, the head will settle into direct contact with the disc surface.

In the more recent disc drives, the actuator for moving the heads across the disc surface is powered by electrical energy. The discs themselves also are rotated by electric motors and any reduction in the power supplied to the drive not only causes the disc to slow down but at the same time interrupts the supply of electrical energy necessary for energizing the actuator. Thus, withdrawing the head becomes a problem with an interruption in the power input to the machine whereas in older disc drives utilizing hydromechanical actuators, the problem was solved by the fact that pressure fluid reservoirs were used which accumulated sufficient energy for head movement without an additional power input.

Accordingly, the primary object of the present invention is to provide for movement of an electrical actuator to a rest position in the event of an interruption in the electrical power supplied to the system.

SUMMARY OF THE INVENTION

An electrical circuit for supplying electrical power from an alternating current supply to an actuator and for moving the actuator to a rest position with any interruption in the electrical power supply, including a transformer having a secondary winding for supplying energy to the actuator, an energy storing circuit for regulating the voltage supplied to the actuator, detection means for signaling any interruption in the electrical power supplied to the circuit and means to set the actuator for movement to a rest position in response to signaling by the detecting means indicating a power interruption, whereby in the event of a power interruption, the actuator is powered by the energy stored in both the tuned circuit for voltage regulation and the DC power supply for movement to the rest position.

DESCRIPTION OF A PREFERRED EMBODIMENT

Figures 1, 2:
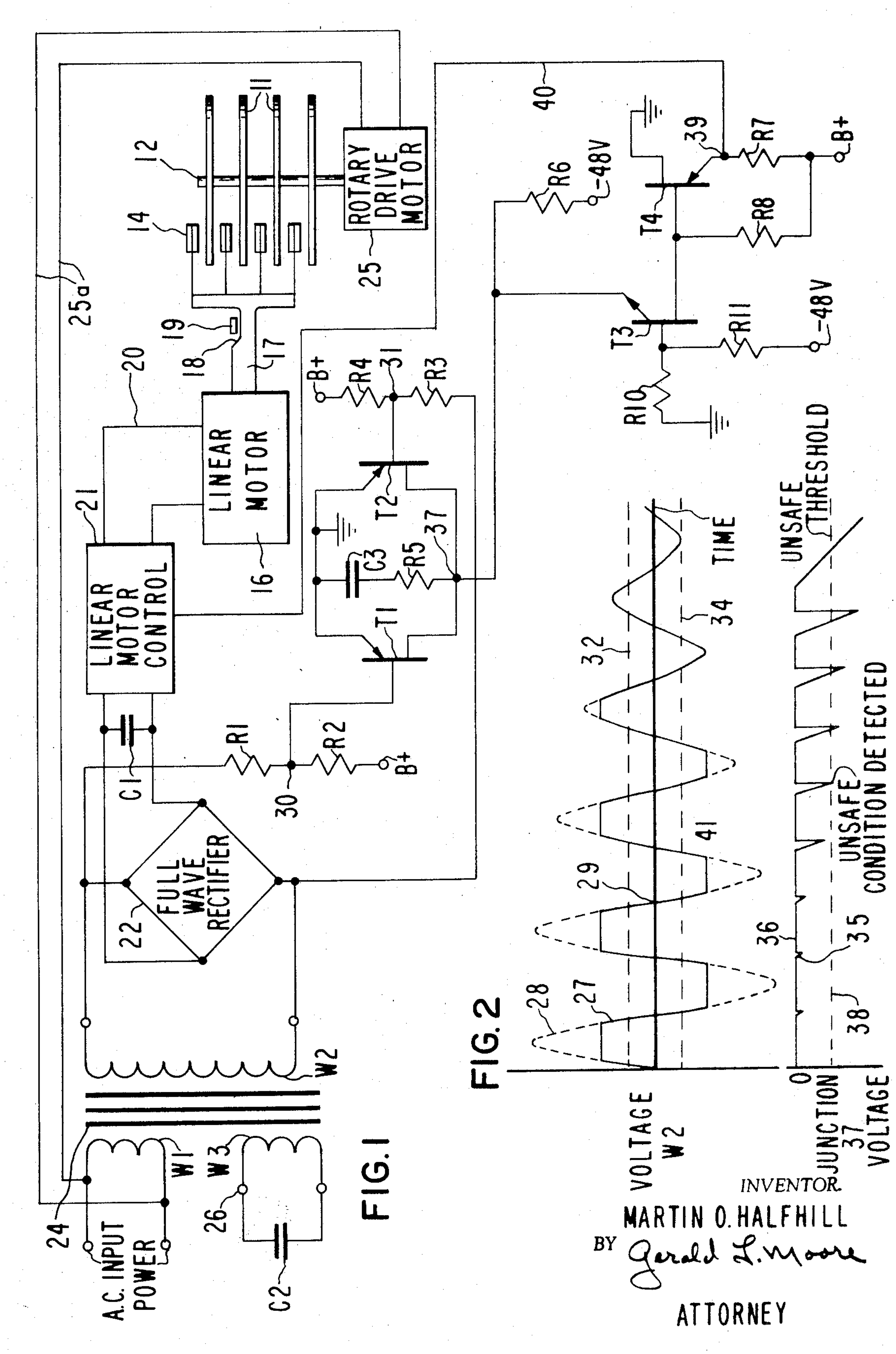
FIG. 1 is a circuit diagram, partially in schematic form, showing a preferred embodiment of the invention.
FIG. 2 illustrates various waveforms appearing within the circuit of FIG. 1.

In FIG. 1, the invention is shown as being used for controlling a disc drive apparatus 10. While this is one application of the invention, it could be used in many others with equally beneficial results. The drive comprises a plurality of discs 11 rotated about a vertical shaft 12 and coated with a magnetic recording material (not shown) for recording information typically in digital form. A plurality of recording heads 14 supported on a yoke 15 are moved laterally towards and away from the shaft so as to scan across the recording surfaces of the discs. The lateral movement of these heads is effected by energization of the linear motor 16 which translates the shaft 17 towards and away from the vertical disc shaft.

As the heads are moved inwardly towards the shaft, a cam surface 18 on the yoke 15 encounters a fixed member 19, which loads the heads in a direction towards the disc surfaces. The recording heads are held in spaced relationship relative to the moving disc surface by an air bearing formed between these adjacent members. As the discs are rotated at a high speed, a film of air moving with the discs holds the heads above the disc surface even though the support for the heads is loaded towards that surface. In this manner, the heads can ride closely to the discs without contact with the recording surface.

The linear motor 16 comprises a stationary core and movable coil (not shown) fixed to the shaft 17 with actuation of the coil being under control of the linear motor control 21. By supplying electric current to the coil, an interaction between the resulting magnetic field and the field of the permanent magnet core causes movement of the coil and attached shaft 17. Thus, as the polarity of the electrical signal supplied to the linear motor coil is changed, movement of the translating shaft 17 supporting the yoke 15 is effected to position the heads in a desired location adjacent the disc surface. The linear motor control acts as a load receiving power from a full-wave rectifier 22 connected across the secondary winding W2 of a power transformer 24. The capacitor C1 serves to smooth out the power signal supplied to the linear motor control 21.

Alternating current power is supplied to the transformer 24 through the primary winding W1. The primary winding W1 also supplies power through the conductors 25*a* to the rotary drive motor 25 for rotating the vertical shaft 12 to which the discs 11 are fixed. For better regulation of the power supplied to the disc drive apparatus, a resonant circuit 26 is connected across a third winding W3 of the transformer to form a ferroresonant circuit which includes the energy storing devices capacitor C2 and the transformer. This ferroresonant circuit is tuned to resonate at 60 cycles (or the frequency of the AC power input) and will saturate at some known level to square off the waveform of the signal supplied to the transformer secondary. In this manner, a better regulation of the voltage supplied to the disc drive apparatus is effected to improve the operation of the control.

As shown in FIG. 2 by the graph of voltage versus time, the waveform represented by the solid line 27 is supplied through the winding W2 to the full-wave rectifier 22. Of course, the negative cyclings of line 27 would be inverted so all the curve lies on the positive side of the axis after conduction through the full-wave rectifier. The extended dotted line portion 28 represents the AC input waveform supplied to the transformer through the winding W1. Because of the saturation of the ferroresonant circuit, the output waveform is truncated. Thus, a better regulation of the power supplied to the disc drive is effected. For purposes of explaining the invention, it is assumed that the AC power input signal is interrupted at point 29. Naturally this is an arbitrary point and the circumstance could occur at any point of the waveform. With the interruption of the input power signal, the rotary drive motor 25 begins to slow but because of the inertia of that rotating system and residual magnetism of the rotary drive motor, a back e.m.f. is generated which supplies power to the transformer 24. Thus, the amplitude of the waveform begins to decay which ordinarily would result in the discs coming to a halt with the heads being positioned in contact with the disc surface. Because of the great possibility of resulting damage to the head and disc surface, this condition is generally undesirable in disc drives. However, it has also been realized that, unless the input power interrupt is detected immediately and some provision made for head withdrawal, the normal condition that occurs immediately is that insufficient energy is available to effect withdrawal of the heads from the disc surface by actuation of the linear motor 16. It is the solving of this problem to which the subject invention is directed.

In accordance with the present invention there is provided means for sensing immediately the interruption in the input power to signal the linear motor control that the recording heads should be withdrawn from the position adjacent the disc surface. Because of the immediate detection of the power interrupt condition and provision being made to utilize the energy stored in the ferroresonant circuit and the DC power supply capacitor C1 in addition to the inertial energy of the rotary motor, sufficient power is supplied to the linear motor to effect withdrawal of the heads to the rest position. In this manner, damage to the heads and disc surfaces is averted.

In order to sense an interruption in the AC power input there is connected to the upper terminal of the winding W2 a voltage divider circuit including resistors R1 and R2 in series connection to a B+ supply. The B+ supply is present for a time after the time that the AC input power disappears. Similarly, to the lower terminal on W2 are connected the resistors R3 and R4 to a B+ terminal. The junction of each of these pairs of resistors is connected to the base of transistors T1 and T2 respectively, which upon firing, serve to ground a capacitor C3. The B+ supply polarity is such as to maintain the transistors T1 and T2 in an "off" or nonconducting state if the voltage out of W2 is not proper. The voltage resulting from the terminals of the transformer winding W2 opposes that of the B+ supply and ordinarily maintains these transistors in the "on" or conducting condition until the voltage drops below a given value. This threshold value is represented by the straight dotted lines 32 and 34 in FIG. 1, keeping in mind that the solid line curve 27 represents the voltage at the terminals of the winding W2. Thus, each time the transformer voltage represented by the curve 27 passes to a value greater in magnitude than the threshold voltage indicated by the dotted lines, one of the transistors (depending on the polarity of the potential of winding W2) is made conductive to permit the flow of discharge current through the resistor R5 to ground. The charge on the capacitor C3 is indicated by the solid line 35 and it can be noted that on each half cycle, the capacitor C3 is partially charged. As the W2 voltage value goes below that threshold voltage indicated by lines 32 and 34, the transistors T1 or T2 are turned off and the capacitor is again charged by current flow through the resistor R6 and brought down to the potential indicated by the dashed line portion 38. Thus, ordinarily the capacitor is not charged so that the capacitor charge and therefore the voltage at the terminal 32 drops below that unsafe threshold value indicated by the dashed line 38. The reference value indicated by the dashed line 38 is supplied to the base of T3 by the resistor dividers R10 and R11. Connected to the junction 37 is the emitter of the transistor T3 with the collector thereof connected through R8 to the B+ supply. For the transistor T3 to be rendered conductive, the voltage at the junction 37 must be less than that indicated by the dashed line 38. With the transistor T3 rendered conductive, the base voltage of the transistor T4 is lowered, thereby grounding the junction 39 and lowering the voltage in the conductor 40.

Referring to FIG. 2, it is assumed now that a power interrupt has occurred at point 29. It can be noted immediately that the slope of the line portion 41 is less since the voltage input supplied to the transformer 24 is now dependent only upon voltage derived from the ferroresonant circuit of the winding W3 and the back e.m.f. voltage from the rotary drive motor 25 as it coasts under the inertial forces of the rotating discs. The voltage is transmitted through the transformer acting as an electrical coupling. Since a longer time passes before the waveform reaches the voltage level indicated by the dotted line 34, the capacitor C3 is permitted to charge more than usual because both transistors T1 and T2 are nonconductive and remain such for a longer time period. At this point, the voltage at the junction 37 decreases past the predetermined unsafe threshold limit indicated by the dashed line 38 thereby causing the transistor T3 to become conductive and turn on transistor T4 and thereby ground the conductor 40.

The conductor 40 connects with the linear motor control and with a drop in the line voltage, that control is adjusted to energize the linear motor for actuation to the rest or retracted position. Since power is still being supplied to the transformer 24 by the resonant circuit of winding W3 and the back e.m.f. of the rotary drive motor 25 and the smoothing capacitor C1 was initially charged, the linear motor is energized for movement to the retracted position for moving the recording heads away from the disc surfaces.

As can be seen in FIG. 2, the input voltage to the rectifier rapidly decays and the disc drive becomes inactivated. However, with the rapid detection of the power interrupt condition, sufficient energy is still retained in the circuit for actuation of the linear motor to the rest position.

What is claimed is:

1. An electrical circuit for energizing a driven load from an alternating current supply wherein the load must be driven to a rest position when the supply is interrupted, said circuit comprising:

a first circuit for supplying energy from the supply to the load and being adjustable for driving the load to the rest position, a second circuit adapted to resonate at the supply frequency to regulate the voltage supplied to the load and including an energy storage device electrically coupled to the first circuit, means to sense the time differential between predetermined points on adjacent half-cycles of the alternating current supply waveform, and means to adjust said first circuit for driving the load to the rest position when the time differential exceeds a predetermined value whereby the first circuit utilizes the energy stored by the energy storage device to drive the load.

2. An electrical circuit as defined in claim 1 wherein said sensing means includes a capacitor and switching means to charge and discharge the capacitor by amounts proportional to the supply waveform and charging level detecting mans to signal when the capacitor charge exceeds predetermined limits to thereby indicate the time differential.

3. An electrical circuit as defined in claim 1 having a third circuit including a motor energized by the alternating current supply and being electrically coupled to the first circuit whereby with an interruption of the supply current, the motor back e.m.f. voltage is utilized to help energize the first circuit for driving the load to the rest position.

4. An electrical circuit as defined in claim 2 including an energy storage device in the first circuit for receiving energy from the second circuit energy storage device and energizing the load during a supply current interrupt condition.

5. An electrical circuit for supplying electrical power from an alternating current supply to a load, which load must be set for movement to a rest position with any interruption in the electrical power supplied to the circuit, said circuit comprising:

a transformer having a secondary winding for supplying electrical energy to said load, an energy storing tuned circuit electrically coupled for regulation of the voltage supplied to the load, detection means for signaling any interruption in the electrical power supplied to the load, means to set the load for movement to the rest position in response to said detection means signaling whereby the load will be powered by the energy stored in the tuned circuit for movement to the rest position immediately when the electrical power is interrupted.

6. An electrical circuit as defined in claim 5 wherein said tuned circuit is connected to a secondary winding of the transformer for regulation of the transformer output voltage.

7. An electrical circuit as defined in claim 5 wherein said detection means includes means to sense the time differential between predetermined points on adjacent half-cycles of the alternating current supply waveform and to signal an interruption in the electrical power supplied when the time differential exceeds a predetermined value.

* * * * *